United States Patent
McDaniel et al.

(10) Patent No.: US 7,505,817 B2
(45) Date of Patent: Mar. 17, 2009

(54) PROGRAMMING AUTOMATION BY DEMONSTRATION

(75) Inventors: Richard Gary McDaniel, Oakland, CA (US); Daniel Conrad Benson, Seattle, WA (US); Steven Michael Schofield, Berkeley, CA (US); Frank Dittrich Schiller, Erlangen (DE)

(73) Assignee: Siemens Technology-to-Business Center, LLC, Berkeley, CA (US)

( * ) Notice: Subject to any disclaimer, the term of this patent is extended or adjusted under 35 U.S.C. 154(b) by 695 days.

(21) Appl. No.: 09/809,155

(22) Filed: Mar. 5, 2001

(65) Prior Publication Data

US 2004/0267515 A1 Dec. 30, 2004

Related U.S. Application Data

(60) Provisional application No. 60/186,969, filed on Mar. 6, 2000.

(51) Int. Cl.
 G05B 11/01 (2006.01)
 G05B 15/00 (2006.01)
 G05B 19/42 (2006.01)
 G06F 9/44 (2006.01)

(52) U.S. Cl. ............................. 700/18; 700/17; 700/83; 700/86; 717/106; 717/107; 717/108; 717/109

(58) Field of Classification Search ............. 700/17–18, 700/83, 86; 717/124–127, 106–109
 See application file for complete search history.

(56) References Cited

U.S. PATENT DOCUMENTS

| | | | | |
|---|---|---|---|---|
| 5,392,207 A | | 2/1995 | Wilson et al. | |
| 5,485,620 A | * | 1/1996 | Sadre et al. | 717/162 |
| 5,566,295 A | * | 10/1996 | Cypher et al. | 715/763 |
| 5,576,946 A | | 11/1996 | Bender et al. | |
| 5,696,914 A | | 12/1997 | Nahaboo et al. | |
| 5,758,029 A | * | 5/1998 | Hall | 706/46 |
| 5,933,353 A | | 8/1999 | Abriam et al. | |

(Continued)

FOREIGN PATENT DOCUMENTS

DE 197 15 494 A1 10/1998

OTHER PUBLICATIONS

PLC-Programming by Demonstration Using Graspable Models; pp. 1-6.*

(Continued)

*Primary Examiner*—Ronald D Hartman, Jr.

(57) ABSTRACT

A system for programming automation by demonstration where a control program may be created or modified through the process of demonstrating desired behavior using graphical representations (or widgets) of physical, programming, and user interface elements. Widgets have state, or properties, and may also have inherent events associated with them or indirect events that are generated through the demonstration process. The general process of demonstration consists of providing several individual example behaviors. Complete behavior, and thus the resultant code, is generated through inferencing from a number of individual example behaviors. The process of programming automation by demonstration reduces the complexity of the programming task and thereby greatly simplifies the workload of the control programmer, allowing the programmer to concentrate more on the specific automation application at hand rather than on the particulars of the programming language or tools. The invention may be applied to a wide range of automation applications, from home and building automation to industrial automation, and may be practiced by novice and expert-level users.

14 Claims, 9 Drawing Sheets

U.S. PATENT DOCUMENTS

| | | | | | |
|---|---|---|---|---|---|
| 5,940,296 | A | * | 8/1999 | Meyer | 700/83 |
| 6,061,602 | A | * | 5/2000 | Meyer | 700/83 |
| 6,064,816 | A | * | 5/2000 | Parthasarathy et al. | 717/109 |
| 6,600,964 | B2 | * | 7/2003 | Hess et al. | 700/97 |
| 6,909,874 | B2 | * | 6/2005 | Holtz et al. | 434/362 |
| 2003/0093165 | A1 | * | 5/2003 | Thiel | 700/86 |
| 2004/0006765 | A1 | * | 1/2004 | Goldman | 717/116 |

OTHER PUBLICATIONS

Watch What I Do: Programming by Demonstration; by Allen Cypher; Chapter 6 (14 pages) and Appendix A; (9 pages).*

R.G. McDaniel "Building Whole Applications Using Only Programming-by-Demonstration," Doctoral Thesis in the field of Computer Science, Carnegie Mellon School of Computer Science, May 14, 1999.

Smith, David Canfield, Ph.D. thesis "Pygmalion: A Creative Programming Environment" Stanford University, Computer Science, 1975.

Wolber, "Pavlov: An Interface Builder for Designing Animated Inferfaces", ACM Transactions on Computer-Human Interaction, vol. 4, No. 4, pp. 347-386, Dec. 1997.

ActiveX Controls—Microsoft Papers, Presentations, Web Sites, and Books, for ActiveX Controls see http://www.microsoft.com/tech/active.asp.

Farm, Luey Visual Language, Software Farm Creating graphics, user interface and diagramming tools, frameworks, and applications in Java™, see http:www.swfm.com.

Microsoft Corp., Visual Basic, "Visual Studio Datasheet", see http://msdn.microsoft.com/vstudio/prodinfo/datasheet/default.asp.

Object Management Group, Common Object Request Broker Architecture (COBRA), "Object Management Group Home Page," http://www.corba.org.

Siemens SIMATIC WinCC Human Machine Interface, "SIMATIC Interactive Catalog" http://www.ad.siemens.de/simatic/html_76/produkte/index/html.

Witten, "A Predictive Calculator" *Watch What I Do: Programming by Demonstration*, Edited by Allan Cypher, MIT Press, Cambridge, Massachusetts, 1993.

Wolber, "Pavlov: Programming by Stimulus-Response Demonstration" (Human Factors in Computing Systems, Proceedings SIGCHI 1996, Denver, Colorado, Apr. 1996, pp. 252-259.

Smith, David Canfield, "Pygmalion: A Creative Programming Environment", Chapter 1 of *Watch What I Do: Programming by Demonstration*, ed. Allen Cypher, The MIT Press, 1993, pp. 19-47.

* cited by examiner

PROGRAMMING AUTOMATION BY DEMONSTRATION

CROSS-REFERENCE TO RELATED APPLICATION

The present application claims priority from provisional U.S. patent application Ser. No. 60/186,969 filed Mar. 6, 2000 entitled "Programming Automation By Demonstration" and listing inventors Richard Gary McDaniel, Daniel Conrad Benson, Steven Michael Schofield and Frank Dittrich Schiller.

BACKGROUND OF THE INVENTION

The present invention relates to computer-controlled automation of physical objects/equipment and in particular to the process of creating and modifying control programs for operating and monitoring automation processes and equipment in the industrial or other automation environments.

Modem industrial or other automation processes require the coordinated execution of several interdependent tasks by many different machines and pieces of equipment. The complexity of automation applications, the large number of signals and their interactions, as well as the increasing need for flexibility has resulted in the widespread adoption of programmable logic controllers (PLCs). These PLC computers control elaborate industrial equipment in accordance with a stored control program. During execution of the control program, the state of the controlled machinery is monitored by evaluating signals from one or more sensing devices (e.g., temperature or pressure sensors), and the machinery is operated (e.g., by activating or de-activating operative components) based on procedural instructions, the sensed signals, human operator input and, possibly, more complex processing.

Each automation application is unique to the demands of the process and therefore requires custom control programming. Furthermore, as the demands of the plant change over time, the corresponding control programs must be revised. This is especially true in flexible manufacturing systems in which major portions of the operation are changed frequently.

Control programming, and in particular PLC programming, is considered a specialized skill because of the knowledge required of industrial processes in general, the specific industrial application itself, and the programming language and tools used to create the control programs. The main challenge to the control programmer is to transform the desired operation and sequencing of the physical machines into appropriate instructions for the PLC.

A similar situation occurs in related application domains, such as building or home automation. Several devices and sensors, logically interconnected by means of a communication network, are to be controlled or coordinated in some fashion, such as via a centralized processor or distributed control architecture. Whether in home automation or industrial automation, the same task, producing programs that control and coordinate the operation of devices and that run on a particular target machine or architecture, is required.

In most cases, automation processes also require some form of user interface, commonly referred to as Human Machine Interface (HMI), for the purpose of displaying the state of the process as well as accepting input from operators, such as starting or stopping tasks. Again, because of the customized requirements of each application, these HMI programs must also be designed and programmed not only to accurately represent the process in an understandable format, but also to work closely with the underlying control program itself, e.g., obtaining data values, providing input data, initiating tasks, etc.

Ordinarily, these two programming tasks, the control programming and the user interface programming, are performed separately, using different sets of tools, and very often done by different sets of specialists. As such, constructing the control and visualization software for automation applications is often a time-consuming and expensive undertaking. The conventional approaches to addressing these two programming tasks are discussed further below.

With respect to the first task of control programming, several programming languages for industrial control have been developed over the years including proprietary languages, the set of IEC 1131 standard languages of the International Electrotechnical Commission, an international standards and conformity assessment body, for languages including LD (ladder diagram), FBD (function block diagram), SFC (sequential function chart), ST (structured chart) and IL (instruction list), and variations of those standards (incorporated hereing by reference). Furthermore, a wide variety of control programming tools are available today, ranging from basic low-level assemblers to integrated development environments. These control programming approaches are based on conventional procedural programming languages in which the programmer specifies instruction statements, functions, procedures. data structures, and so on. Some of these systems include forms of graphical representation such as block diagrams, or ladder logic graphs, which provide a level of abstraction to help the programmer deal with the complexities of the program. In general, with the present practice the programmer must make the mental translation from the required physical machine operations to the appropriate input/output signals and to the corresponding language constructs that will produce the correct control behavior.

With respect to the second task of programming or constructing the visual user interface front end for operating and monitoring the controlled process, there are several such tools available today. In user interface programming, the main task for the programmer is to lay out information displays that render data obtained from the process and (usually) to accept user input to affect the program operation (see, for example, Siemens SIMATIC WinCC Human Machine Interface, "SIMATIC Interactive Catalog" (herein incorporated by reference). Many such user interface systems provide text as well as graphical elements that can be positioned on the display screen and configured such that specific data signals are displayed accordingly, such as a bar graph to show temperature or pressure, etc. These systems also provide user interface elements for accepting user input such as pressing a button or entering text. When supported, the types of programming in user interface construction systems are primarily procedural languages or scripting languages used for such tasks as accessing data values, converting data to alternate forms for the purpose of display, setting internal data values or initiating specific actions. However, conventional user interface systems are not designed for creating or modifying control programs.

Accordingly, it is seen that the entire conventional approach in automation to programming, including the first and second programming tasks discussed above, that uses current conventional programming languages has a major disadvantage of being expensive and time consuming.

As seen from the above, it is desirable to have an alternative system for programming in automation environments, such that the control programming and the user interface programming are performed together, using one tool. It is also desirable to have computer-controlled automation performed more easily and economically, without the need for the expense and manpower of multiple specialists having different areas of particular expertise. This is particularly so in complex automation processes where situations change dynamically and an array of several different possible actions would be necessary (and which may require a user to intervene with the programmed action).

SUMMARY OF THE INVENTION

The present invention advantageously provides programming automation by demonstration by using one tool that combines the control programming and the user interface programming. Using programming by demonstration techniques, computer-controlled automation can be performed more easily and economically, without the need for multiple specialists having different areas of particular expertise.

According to a specific embodiment, the present invention provides a computer programming method for use in controlling an automation process. The method includes the step of providing on a first computer platform a programming by demonstration tool used as both a control program and a visual user interface for the control program. The programming by demonstration tool includes a library of program widgets, a graphical editor capable of enabling manipulation by a user of a graphical representation of any of the program widgets, and an inferencing engine for recording and processing the manipulation to produce executable code. The method also includes the step of providing an input/output module, interfacing with the programming by demonstration tool, for coupling the program widgets to external input and output signals of the automation process such that the executable code is used to control the automation process.

This and other specific embodiments of the present invention, as well as its features and advantages, are described in further detail below in conjunction with the following drawings.

DETAILED DESCRIPTION OF THE SPECIFIC EMBODIMENTS

Figure 1:
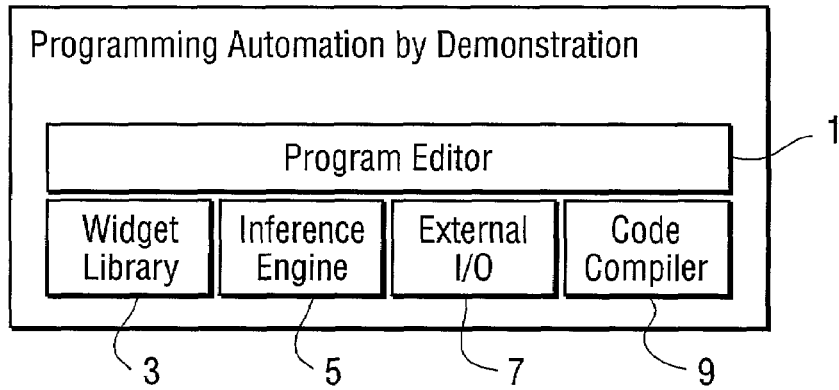
FIG. 1 illustrates the overall system architecture block diagram, according to a specific embodiment of the present invention.

The present invention uses a technique called "programming by demonstration" to greatly simplify the task of programming in automation applications, where real physical objects, such as sensors and other equipment, are manipulated. Unlike the conventional control programming languages and tools typically used in automation environments, the programmer demonstrates the desired behavior of the control program by manipulating graphical representations of physical machines, devices, and programming elements. In a preferred embodiment, the actions performed by the user are combined by means of an inferencing engine to produce executable programs that run in the editor environment on a primary machine (e.g., Windows-based PC) or may be compiled and run on a different platform secondary machine such as a PLC. In other specific embodiments, the primary (or secondary) platforms can be UNIX, Macintosh, or other machines (e.g., palm computing device, wristwatch, etc.). The process of using programming by demonstration for automation, in accordance with the present invention, produces simultaneously a logical control program and a representational visual interface for the control program. Complexity of the programming task is thereby reduced, allowing the programmer to concentrate more on the specific automation application at hand rather than on the particulars of the programming language or visualization toolkits. The invention may be applied to a wide range of automation environments, from home automation to industrial automation, and practiced by novice and expert-level users. Specific embodiments of the present invention can be computer code that is stored on a variety of storage media, such as floppy disk, hard disk drive, CD-ROM, or other memory.

With the present invention, creating and modifying control programs to perform specific control tasks and the visual user interface front ends for operating and monitoring those processes are provided in a single tool. The mental gap, normally created by the need for a programmer's mental translation from the required physical machine operations to the appropriate input/output signals and to the corresponding language constructs that will produce the correct control behavior, is addressed in the present invention by providing high level programming constructs in the form of "widgets" and "behaviors" that directly correspond to the physical machines and processes, as described further below.

Conventional programming by demonstration techniques have commonly been used for somewhat simple programming tasks, mathematical computer calculations, and interactive software games. However, programming by automation does not appear to have been used in implementing the oftentimes varied, complex processes of manipulating actual physical objects in an automation environment. The essential quality of programming by demonstration systems is that, at some point, the programmer acts out the process with examples that the computer is to perform. In doing so, the developer requires objects (referred to as "widgets" in a specific embodiment of the present invention) that represent the features of the process, methods for manipulating the objects into their different states (referred to as "examples" in the specific embodiment of the invention), and an engine for recording these manipulations and converting them to code that can be executed to perform the process (referred to as "behavior" in the specific embodiment of the present invention).

In accordance with specific embodiments, the present invention can use various forms of programming by demonstration, such as mentioned herein. For example, D. C. Smith in his Ph.D. thesis entitled "Pygmalion: A Creative Programming Environment" (Stanford, 1975) (herein incorporated by reference) describes an early programming by demonstration approach to aid in the writing of small programs (manipulating data flows) using an example as a template to perform other operations. However, this approach does not perform any inferencing. As another example, I. H. Witten in "A Predictive Calculator" (*Watch What I Do: Programming by Demonstration*, Edited by Allan Cypher, MIT Press, Cambridge, Mass., 1993) (herein incorporated by reference) describes a programming by demonstration approach to eliminate the further manual entry of additional calculations in a calculator object by predicting or inferencing the next entry when a user has previously entered repeated mathematical calculations. As a further example, D. Wolber in "Pavlov: Programming by Stimulus-Response Demonstration" (Human Factors in Computing Systems, Proceedings SIGCHI 1996, Denver, Colo., April 1996, pp. 252-259) (herein incorporated by reference) discusses a programming by demonstration approach that is capable of inferring only linear numerical relations between a certain input and a certain output. An approach to programming by demonstration is described by R. D. McDaniel in his Ph.D. thesis entitled "Building Whole Applications Using Only Programming-By-Demonstration" (Carnegie Mellon University, Tech. Rept. CMU-CS-99-128 or CMU-HCII-99-100, May 1999) (herein incorporated by reference). This approach, which is used in preferred embodiments of the invention, provides a more robust, complete programming tool capable of inferencing that can be useful in complex automation applications.

1.1 General

The system architecture of the preferred embodiment of the present invention is illustrated in FIG. 1. The five main components consist of a Program Editor 1, a Widget Library 3, an Inferencing Engine 5, an External Input/Output (I/O) module 7, and a Code Compiler 9.

In the preferred embodiment of the present invention, Program Editor 1 is a graphical editor capable of inserting, arranging, and manipulating graphical representations of widgets, loading and saving data as files, copy and paste operations, as well as many other well-known functions commonly found in modern editors (such as from Microsoft Corp., Visual Basic, "Visual Studio Datasheet"; or from Software Farm, LUEY Visual Language, "Software Farm Creating graphics, user interface and diagramming tools, frameworks and applications in Java™"; both preceding materials are incorporated herein by reference).

Widget Library 3 holds a collection of predefined widgets and provides the means of presenting those widgets for use in Program Editor 1. In one embodiment of the present invention, the Widget Library 3 could take the form of a simple "palette" from which to choose widgets or consist of a large database of widgets. Some examples of widget libraries can be found from Microsoft Corp., "ActiveX Controls—Microsoft Papers, Presentations, Web Sites, and Books, for ActiveX Controls"or from Object Management Group, Common Object Request Broker Architecture (CORBA), "Object Management Group, Home Page", (both preceding materials are incorporated herein by reference).

Inferencing Engine 5 does the work of recording and processing the user's manipulations of widgets to produce the executable code. Specific details of possible Inferencing Engines can be found in the above-incorporated references to Witten or Wolber, and the preferred Inferencing Engine is found in the above-incorporated reference to McDaniel.

External I/O module 7 serves to connect program widgets to external input and output signals of the automation process, such as through an I/O device, serial port, or other means of data transmission. An exemplary External I/O module is the Siemens STEP 7 software development product, "SIMATIC Interactive Catalog", see http://www.ad.siemens.de/simatic/html_76/produkte/index.htm (already incorporated by reference).

Code Compiler 9, which is used in some embodiments as described below, converts the code generated internally by the Inferencing Engine to machine-readable code for a given platform, such as a PLC. Code compilers generally are discussed by A. Aho and J. Ullman in *Principles of Compiler Design*, Addison-Wesley Publishing Company, ISBN 0-201-00022-9, 1979 (herein incorporated by reference).

Figure 2:
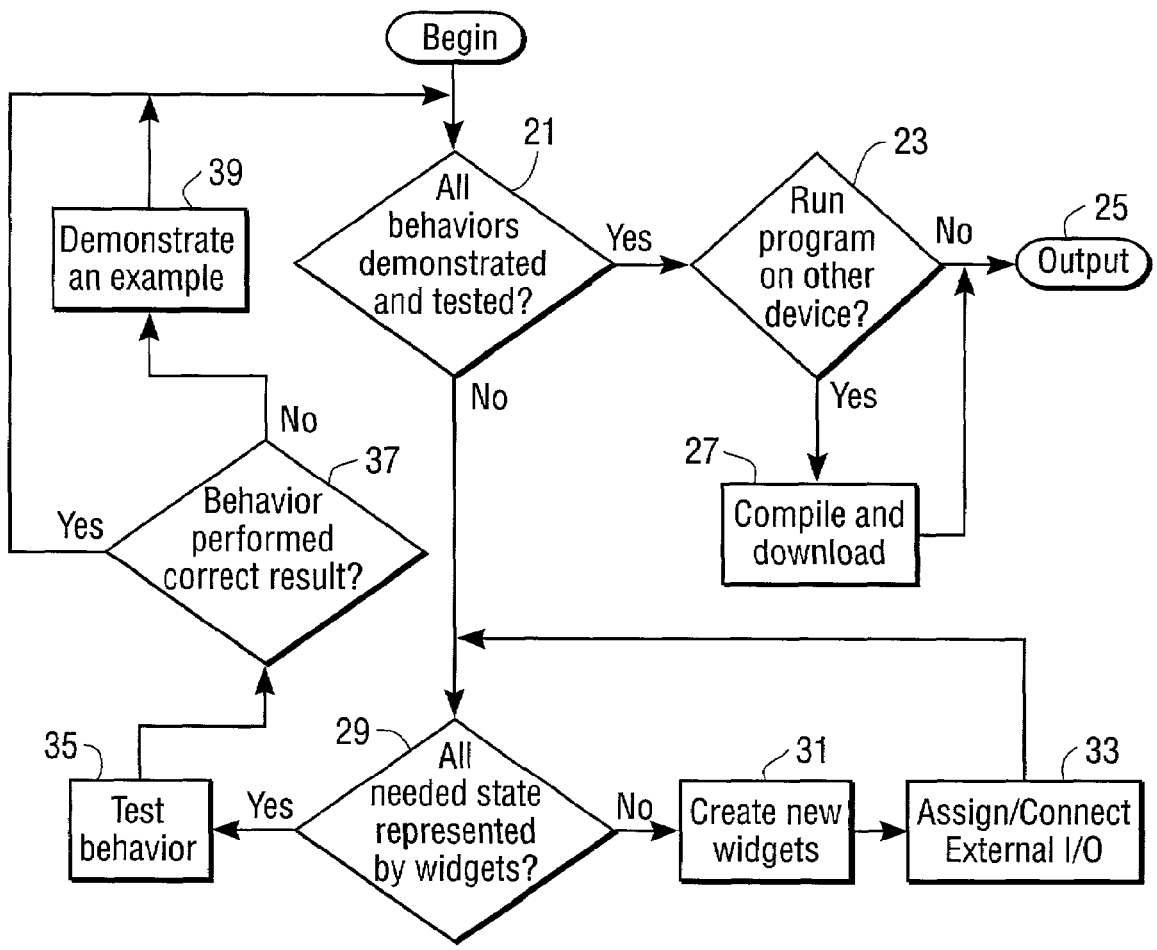
FIG. 2 illustrates a flowchart of a process for creating new or modifying existing control programs using programming by demonstration, in accordance with a specific embodiment of the present invention.

The overall process of the present invention of using programming by demonstration for simplifying automation is illustrated from the user's point of view by the flowchart of FIG. 2. The process is to create or modify control programs, so the initial state provides for either a new (empty) control program or an existing control program that may contain widgets and behaviors. In general, the process proceeds until all behaviors have been demonstrated and tested (as determined in step 21), i.e., the program is completed. At that point, the user has the option in step 23 of running the program either within the editor itself (and proceeding to step 25 to output the control program), or on another device. If the option of running the program on another device is selected in step 23, then the program is compiled for that device and may then be downloaded for running on the target device in step 27.

If it is determined in step 21 that not all behaviors have been demonstrated and tested, then a decision is made in step 29 regarding whether more widgets are needed to represent the needed state. If so, new widgets are created (or added to the program) in step 31, and (possibly) assigned and connected to external I/O in step 33. If all states are represented by widgets, then the user tests the behavior in step 35. If the behavior does not perform correctly, as determined in step 37, the user demonstrates a new example in step 39 and repeats the overall process starting with step 21 until all behaviors have been demonstrated and tested. As mentioned above, the final output in step 25 of the process shown in FIG. 2 is a new or modified control program that can be executed.

When run in the editor, the same widgets used for programming also provide the feedback and user input capabilities for the runtime execution of the program. The feedback may come in a variety of forms ranging from visual changes, animation, sound, other forms of stimulus, triggering of events, or combination thereof. In this way, the present invention may also be used for the runtime monitoring and control of the automation process, thus making it unnecessary to program a separate user interface or use other tools. This also means that the same programmer can produce the automation control program and the user interface at the same time.

The present invention thus provides a system for programming automation by demonstration where a control program may be created or modified through the process of demonstrating desired behavior using graphical representations (or widgets) of physical, programming, and user interface elements ("machine widgets," "programming widgets," and "user interface widgets" respectively) that have state or properties. Widgets may also have inherent events associated with them or indirect events that are generated through the demonstration process. Complete behavior, and thus the resultant code, is generated through inferencing from a number of individual example behaviors. The general process of demonstration consists of providing several individual example behaviors. An example is given by a stimulus, initiating the training mode, configuring the desired outcome state, and ending the training mode. Two modes are required in order to distinguish between operations that the controller is meant to perform (runtime execution) and operations that the developer needs to perform for the sake of editing. The inference engine infers the complete behavior of the system from multiple examples in an incremental fashion. The program code may be executed in the editor itself or compiled and downloaded to another device, such as a PLC. It is possible to use the resulting graphical representation of the control code as the process monitoring and control user interface, thereby eliminating the need of programming a separate user interface or using additional tools for this purpose. The process of programming automation by demonstration reduces the complexity of the programming task and thereby greatly simplifies the workload of the control programmer, allowing the programmer to concentrate more on the specific automation application at hand rather than on the particulars of the programming language or tools. Finally, this method may be applied to a wide range of automation applications, from home and building automation to industrial automation, and may be practiced by novice and expert-level users.

The following describes in more detail the three main processes of the present invention: constructing widgets, demonstrating behaviors, and inferring behavior.

1.2 Constructing Widgets

In the first stage of programming, the developer represents the essential features of the automation process. In the present invention, this is accomplished using widgets. Widgets represent the physical actors in the system such as sensors, machines, and other input/output devices, referred to as "machine widgets." Other widgets represent internal states of the process such as numbers, text, modes, and timers. These internal widgets are called "programming widgets." Additionally, there are widgets that are used to provide feedback in various forms or acquire input data, such as text boxes, buttons, etc. These widgets are called "user interface widgets." Individual elements of the state are constructed using combinations of widgets as needed. Typically, the developer will form some conception of the process components and then construct each component out of machine, programming, and user interface widgets as necessary.

Figure 3:
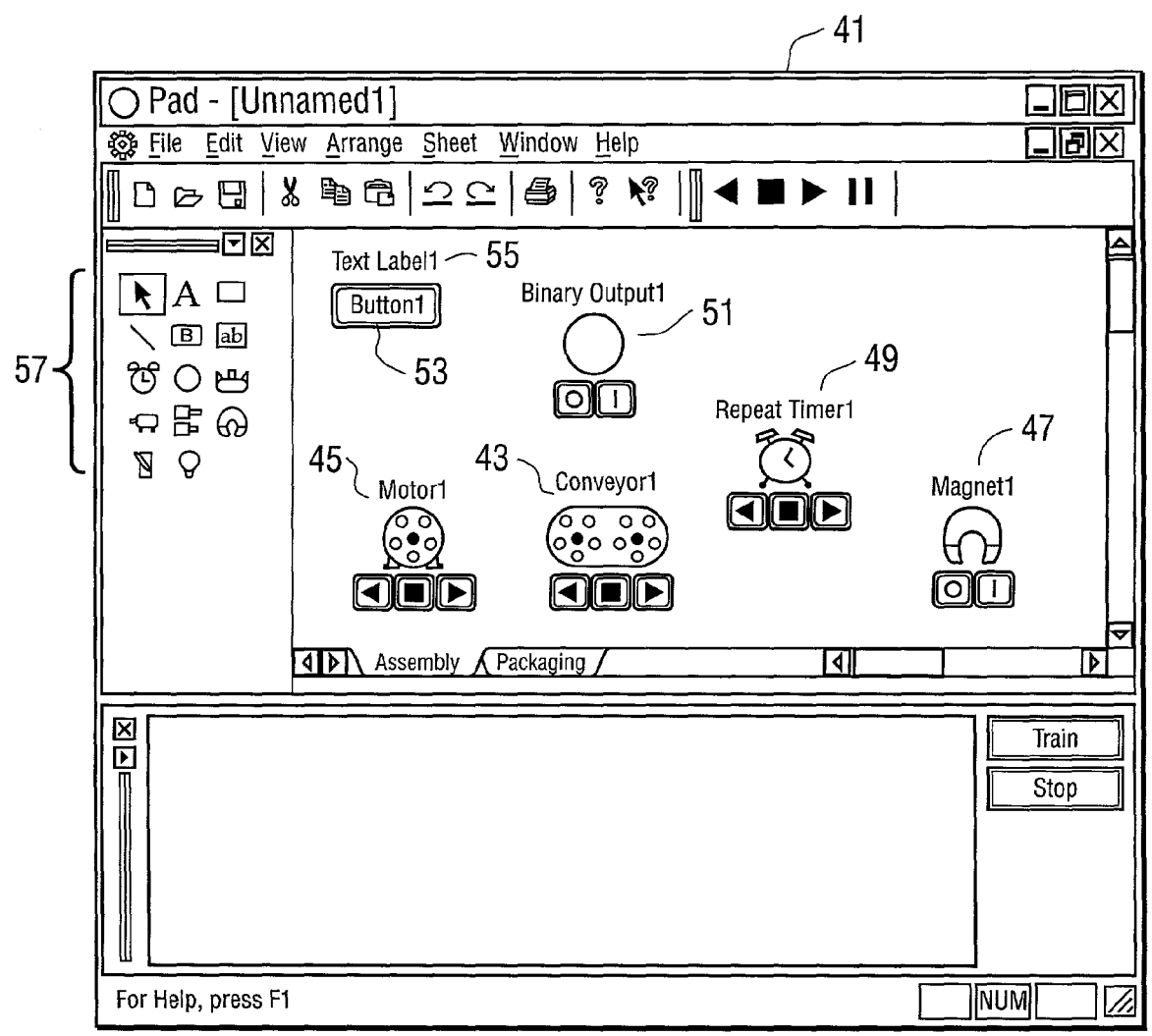
FIG. 3 illustrates an example of a graphical editor for generating programs through demonstration, according to one specific embodiment of the present invention.

In one embodiment of the present invention, widgets are specified in a graphical drawing editor 41, as shown in FIG. 3. The widgets are graphical representations of physical, programming, and user interface elements and are drawn in a graphical display. According to a specific embodiment in FIG. 3, examples of "machine widgets" are a conveyor1 widget 43, a motor1 widget 45, a magnet1 widget 47, and a binary output1 widget 51. An example of a "programming widget" is a repeat timer1 widget 49. Additionally, examples of "user interface widgets" are a button1 widget 53 and a text label1 widget 55, as shown in FIG. 3. A library 57 of widgets in a specific embodiment can be shown in a portion of graphical drawing editor 41. Though widgets are drawn manually in the present invention, the physical components of the system can potentially be determined automatically, for instance, by inspecting the communication network that connects the components to the controlling device or PLC. Programming and user interface widgets that are not part of composite machine widgets cannot be determined this way and must be specified by the developer.

Widgets have a means of viewing and altering their states or initiating events. In one embodiment of the present invention, some widgets provide direct graphical means of changing states, such as editable regions for entering text directly, or initiating events, such as buttons that may be pressed. A more general means of modifying state is through the use of a secondary "property page" window that displays all properties of a widget and allows alterations of those values.

1.3 Demonstrating Behaviors

In the second stage of programming, the developer considers the behavior of the automation process and determines the actions that each component performs in order to accomplish that behavior. The developer normally divides the overall behavior of the process mentally into several simpler and independent sub-behaviors, each of which can be specified separately.

The widgets that the developer created can be manipulated to reach the different states that the process must undergo to perform a behavior. The process of demonstration thus involves setting states that cause a behavior to occur and then modifying the state to show the desired outcome. An example is defined as a single instance that pairs a causal state to an outcome state. A complex behavior will generally require several examples to demonstrate each of the causes to which it reacts and outcomes that it can produce.

Widgets can also perform events that can be activated during the demonstration and/or runtime process. For instance, a binary sensor is activated when it senses its target in the environment, such as the interruption of a light beam to detect the presence of a box on a conveyor belt. In this case, the binary sensor widget (e.g., widget 51 in FIG. 3) contains an event that represents the occurrence of the sensor becoming active. Events of a widget act as triggers for behaviors. Thus, examples will specify events along with a causal state for triggering a behavior. Pre-defined events, such as a button widget being pressed, are referred to as "direct events," whereas events that are created for widgets are referred to as "indirect events." For example, if the programmer wanted an event to take place whenever a rectangle widget became red, an indirect event would be created for the rectangle and used to generate that behavior. Indirect behaviors, or behaviors created with indirect events, may also be thought of as constraint-like behaviors or value-driven behaviors because the values of objects drive the behavior. In this way, the present invention allows a mixture of both event-based and value-based programming.

The developer must distinguish between operations that the controller is meant to perform (runtime execution) versus operations that the developer needs to perform for the sake of editing. This requires at least two modes in the programming system: one for basic editing, and the second for capturing examples (training mode). One embodiment of the present invention uses precisely these two modes. Additionally, because the basic editing mode is the same as "run" mode the program is essentially always in run mode except when demonstrating new behaviors.

In the previously described embodiment, demonstration typically occurs "off-line" with no connection to the physical components of the system. However, it is also possible for the developer to use the physical components of the process to demonstrate examples. The state of the machine widgets is manipulated manually to act in ways that the physical machines will operate when running. When it is safe to do so, and if the physical object possesses appropriate sensing devices, the developer can also manipulate the physical components as a method for changing its state. This technique can be used to demonstrate both causal and final states of an example.

Figure 4:
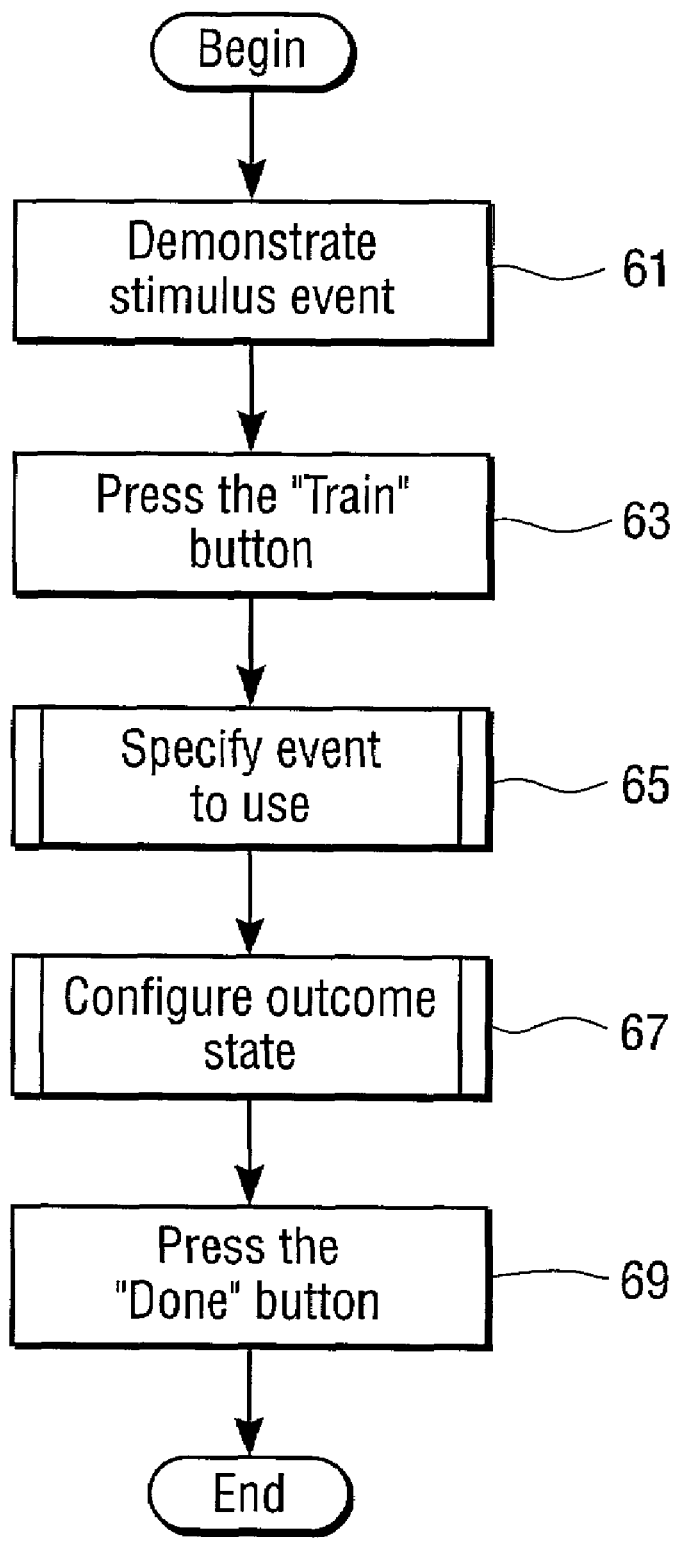
FIG. 4 illustrates a flowchart of the process that can be used with a specific embodiment of the invention for creating a new behavior.

The remainder of this section will describe one embodiment of the present invention for demonstrating behaviors. The overall process for demonstrating behaviors is illustrated in FIG. 4. Given a set of widgets in the program, the first step (step 61) is to provide a stimulus event. This may take the form of stimulating a widget that already has an event (e.g., pressing a button), simulating a triggered event (e.g., activating a sensor input), or changing a widget's property, in which case an indirect event will be created. The second step (step 63) is to enter the training mode by pressing the Train button. This indicates to the system that the user is ready to provide an example behavior based on the most recent stimulus event. The third step (step 65) is to specify the event that is to be used for training purposes (see below and FIG. 5). The fourth step (step 67) is to configure the desired outcome state (see below and FIG. 6). Finally, pressing the Done button in step 69 exits the training mode, and the newly created behavior becomes part of the program.

Note that in addition to adding new behaviors to the program using the Train button, it is also possible to modify existing behaviors for a particular widget, or to correct an existing behavior by teaching the system to stop doing a particular behavior. For this purpose a Stop button is provided, which also initiates the training mode but with the indication that an existing behavior is to be stopped rather than a new behavior added.

Figure 5:
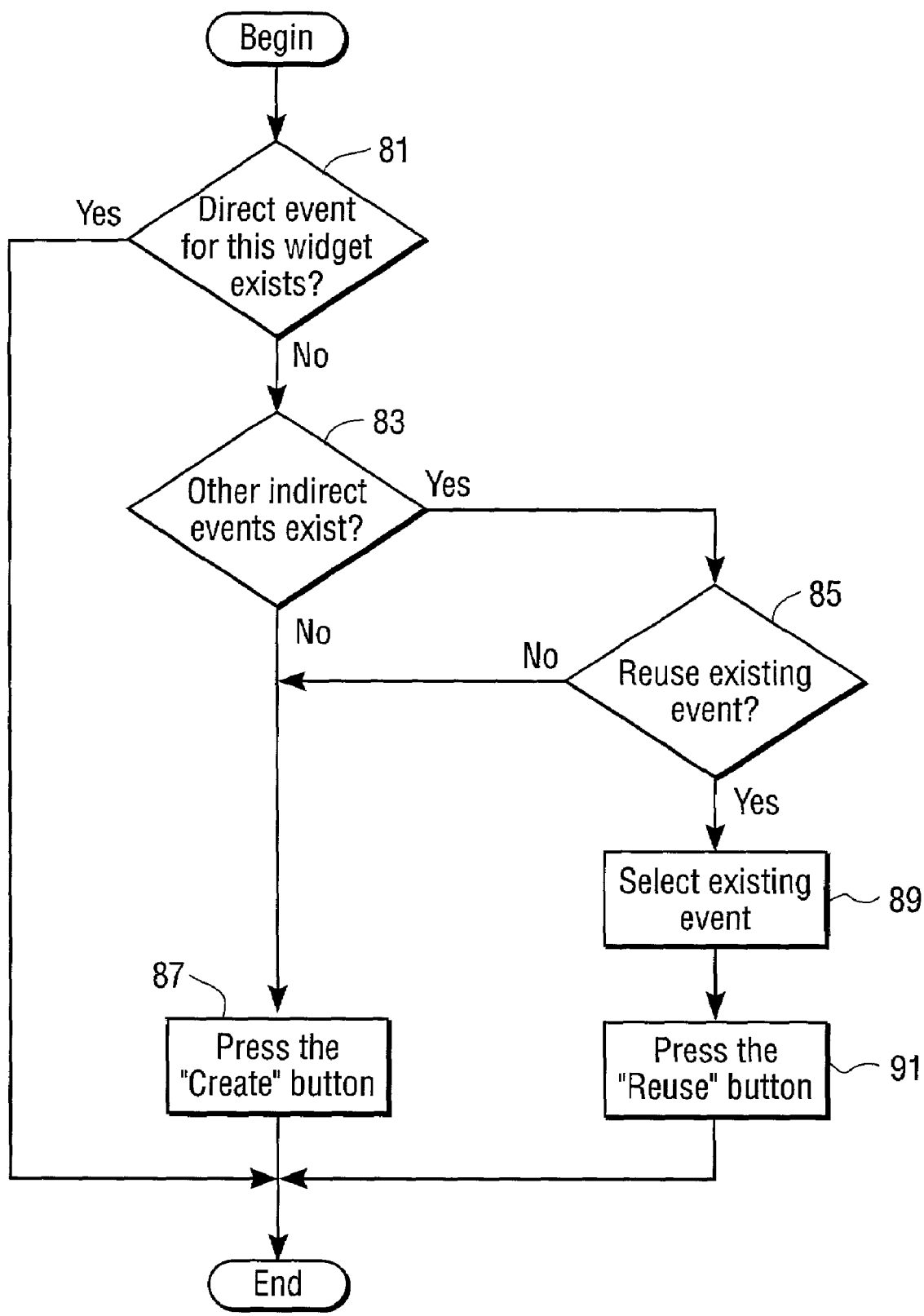
FIG. 5 illustrates a flowchart of the process of specifying the event to use in training mode, in accordance with a specific embodiment of the present invention.

The process of specifying the event to be used in training mode is illustrated in FIG. 5. The process shown in FIG. 5 occurs after the Train button (or Stop button) is activated. Having provided stimulation with a given widget, if it is determined in step 81 that a direct event for this widget already exists, it becomes the event to be used and the process of FIG. 5 ends. If there are no other indirect events for this widget (step 88) or the user does not want to reuse those events (step 85), the Create button is pressed in step 87 and the widget is given a newly created indirect event, which becomes the event to be used in training. Otherwise, the user selects the existing event in step 89, presses the Reuse button in step 91, and that event becomes the one to use.

Figure 6:
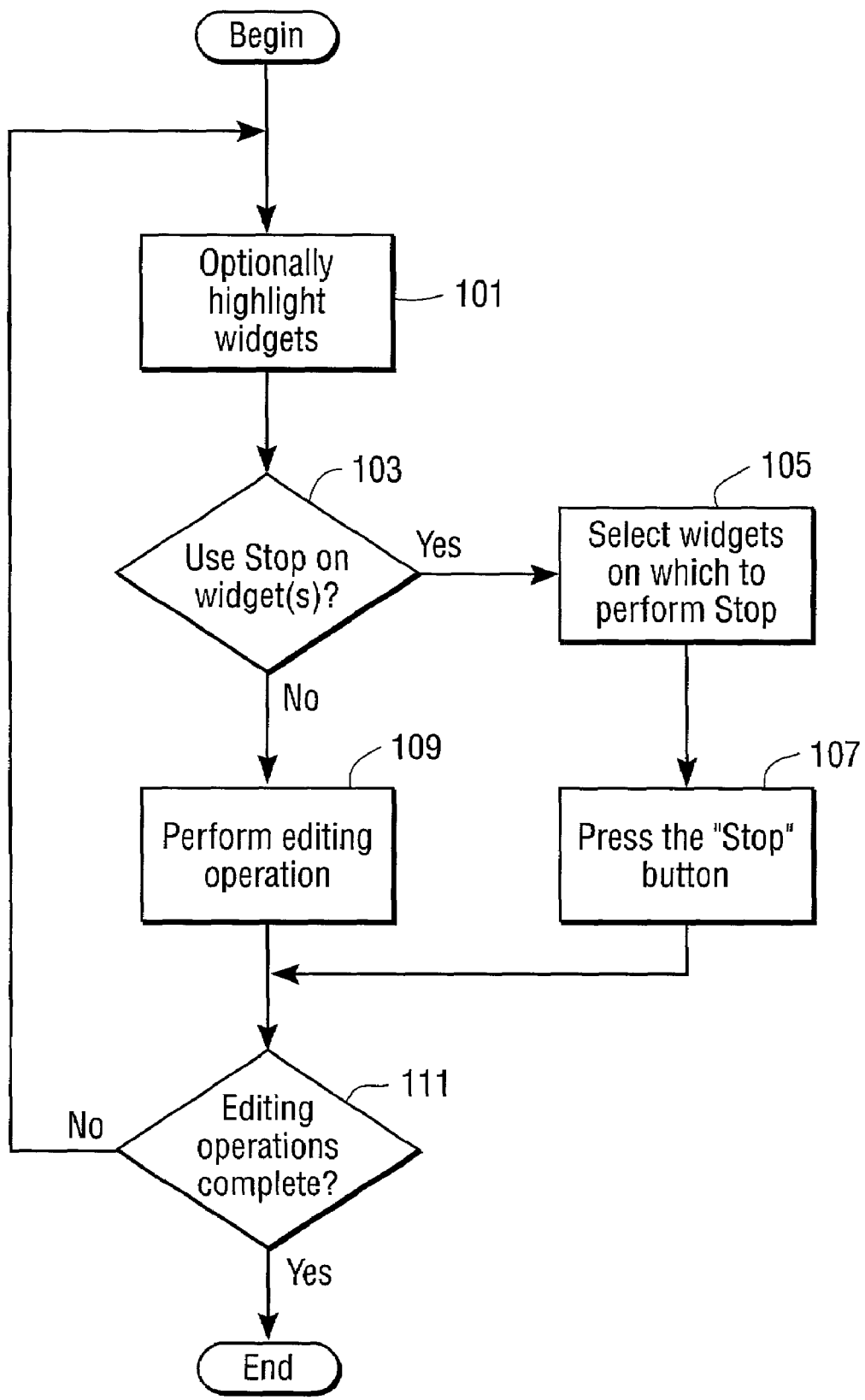
FIG. 6 illustrates a flowchart of one embodiment of the present invention for the process of configuring the outcome state in training mode.

The process of configuring the outcome state in training mode is illustrated in FIG. 6. At this point, the user may optionally highlight widgets in step 101, and choose in step 103 to stop some existing behaviors of selected widgets or edit their properties. If a decision is made to stop a behavior of a selected widget, then that widget is selected in step 105, and the Stop button is pressed in step 107. If a decision is made in step 103 to edit properties, then editing operations are performed in step 109. This process is repeated until all editing operations are completed, as determined in step 111.

Figure 7:
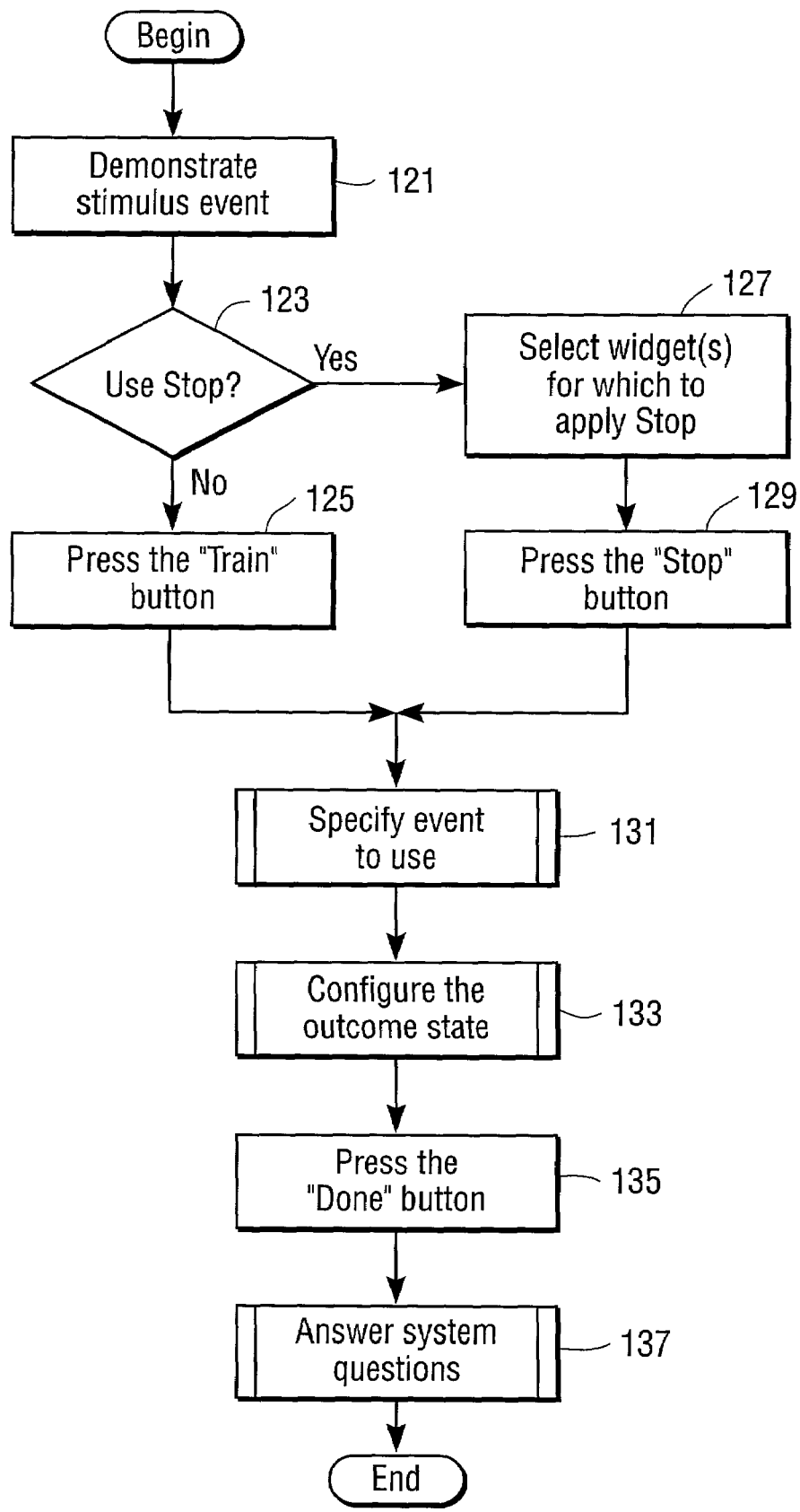
FIG. 7 illustrates a flowchart of the process for modifying an existing behavior.

As previously discussed, a complex behavior will generally require several examples to demonstrate each of the causes and outcomes that it can produce. Creating more complex behaviors is equivalent to modifying existing behaviors, either by adding new behaviors or stopping some portions of existing behaviors. The process for modifying existing behaviors (such as would occur in step 109 of FIG. 6) is illustrated in FIG. 7. This process is identical to the process of creating a new behavior except for two main differences. The stimulated event that is already associated with an existing behavior is demonstrated in step 121. It is determined in step 123 whether using the Stop button is desired. If not, pressing the Train button in step 125 indicates that the existing behavior is to be augmented with a new behavior. If using the Stop button is desired, the particular widget to stop is selected in step 127 and the Stop button is pressed in step 129. Pressing the Stop button indicates that some portion of the existing behavior is to be prevented. From either steps 125 or 129, the event that should be used is specified in step 131, and the outcome state is configured in step 133. Then, the Done button is pressed in step 135. It may be necessary for the system in step 137 to enter into an interactive dialog with the user in order to clarify ambiguities or potential inconsistencies as a result of the newly demonstrated example.

Figure 8:
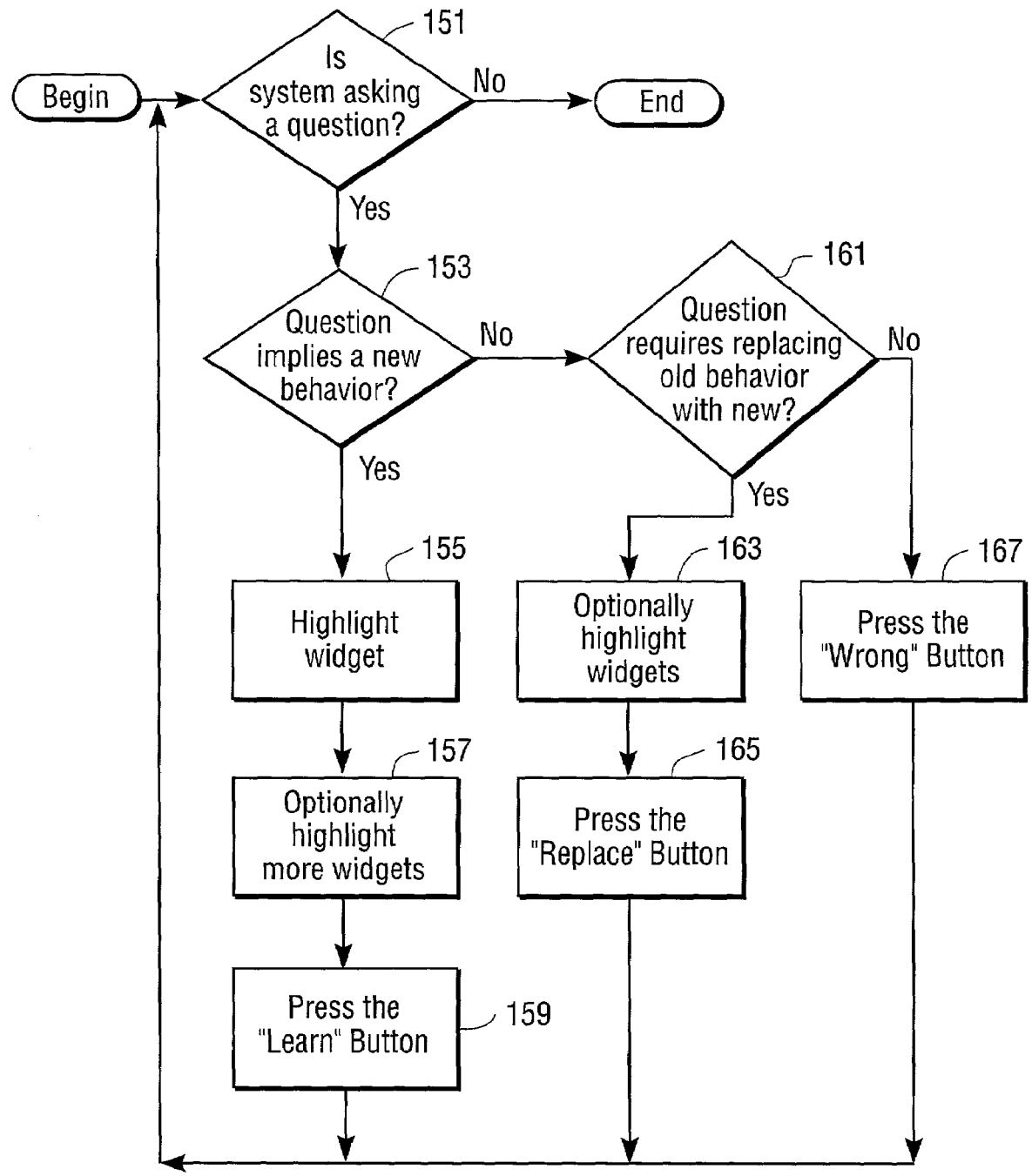
FIG. 8 illustrates a flowchart of a process for answering system questions at the end of a training session.

The process for answering system questions at the end of a training session (such as step 137 of FIG. 7) is illustrated in FIG. 8. In general, questions are formulated and displayed by the system in a particular region of the interface. The user responds to the questions by optionally highlighting (selecting) the widgets or other markers and pressing buttons. If the system asks a question (step 151), and the question implies a new behavior, as determined in step 153, then the user highlights one or more widgets (steps 155 and 156) and presses the Learn button in step 159. This identifies to the system the dependent widgets associated with the new behavior. If the question requires replacing an existing behavior with a new behavior (determined in step 161), the user optionally highlights widgets in step 163 and then presses the Replace button in step 165. This identifies the dependent widgets associated with the new behavior that is to replace the existing behavior. If neither of these cases is true, then the user in step 167 presses the Wrong button, which indicates to the system that the question is irrelevant. In any case, the system may generate new questions or reformulate questions to be presented again. The overall process is repeated until no more questions remain.

1.4 Inferring Behavior

It is not necessary for the developer to demonstrate every possible state that the controller can reach. Instead, the developer shows representative examples of states that imply what the controller should do in all other states. The system uses an inferencing engine to generalize the representative examples into a behavior that functions for all possible states.

There are many varieties of algorithms for performing inferencing. The simplest is to not perform any inferencing at all. Without inferring behavior, the system only records the actions that the developer performs without interpretation. For sufficiently simple controllers, replaying the recorded actions is sufficient. For controllers that require more complicated behaviors, the developer would need to be able to edit the recorded actions to add structure to the controller.

Another branch of programming by demonstration inferencing algorithms attempts to generalize behavior using one example but no more. These algorithms find patterns in the recorded example and generalize recognized features. However, if the algorithm does not produce the correct result, the developer must manually edit the generated code.

The most sophisticated inferencing algorithms use multiple examples to generate code. If the algorithm does not produce the correct result initially, the developer may continue to demonstrate examples for cases where the code fails. This method puts the least burden on the developer since the developer is generally no longer required to know how to read or edit programming code. Depending on the strength of the inferencing engine, the system can generate all the needed code without the developer's intervention. However, weaker algorithms will still require the developer to fill in the code that the system is unable to produce automatically.

There are two principle ways to infer behavior from multiple examples. As discussed below, one is an incremental approach and the other collects the examples and produces behavior from all at once.

Figure 9:
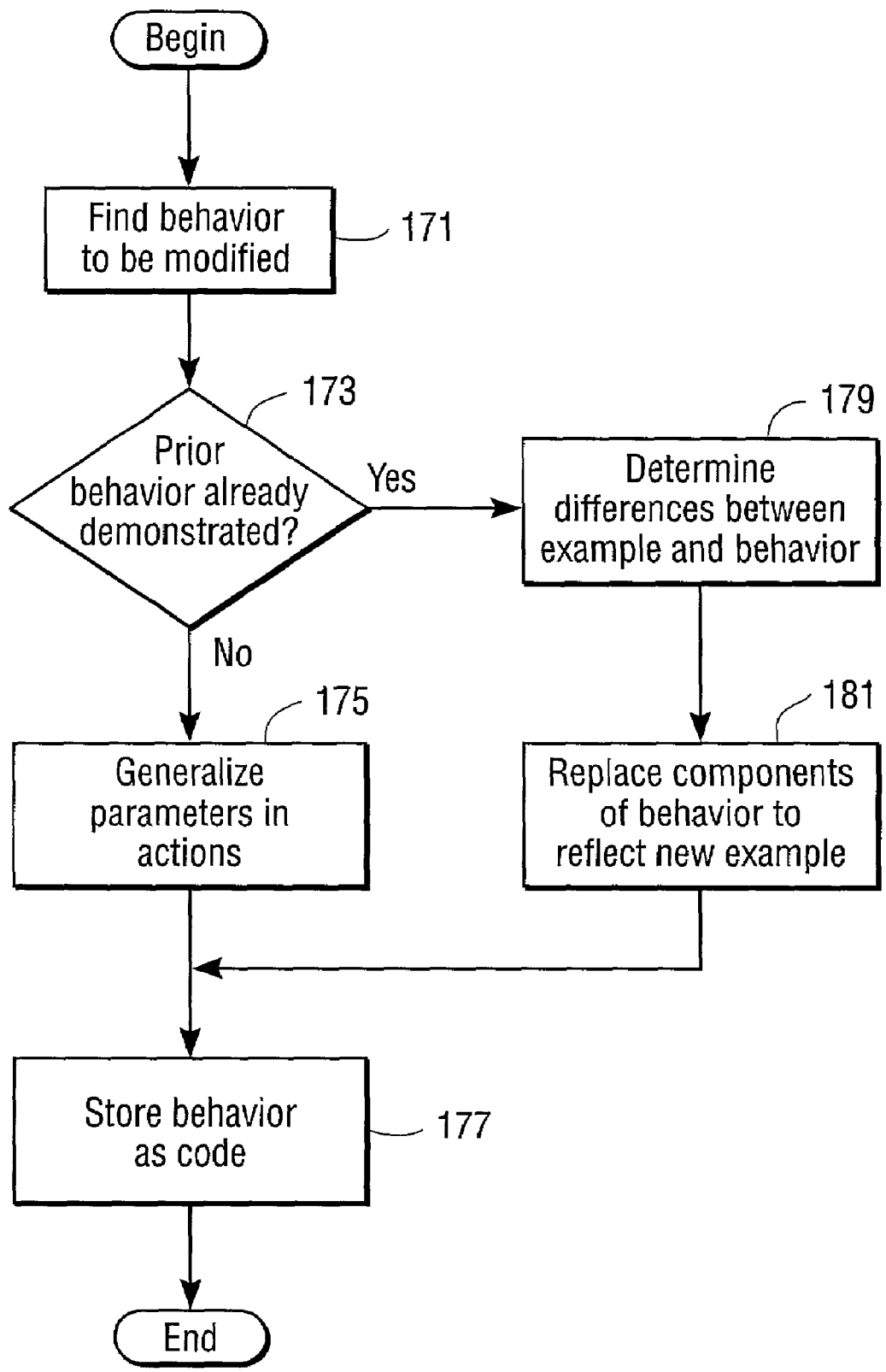
FIG. 9 illustrates a flowchart of an example inferencing algorithm for inferring behavior from multiple examples using an incremental approach.

In the incremental approach, shown in FIG. 9, the affected behavior is determined based on the event and the causal state of the example. Given that the user has just completed demonstrating an example behavior, the example is then integrated into the behavior by matching the example against parts of the behavior's code. The system determines a reasonable way to change the code so that the behavior will produce the results of the given example. In particular, as shown in FIG. 9, the system finds a behavior to be modified in step 171. If this behavior has not already been demonstrated (determined in step 173), then the parameters in the actions for this behavior are generalized in step 175, and the behavior is then stored as code in step 177. However, if the behavior is a prior demonstrated behavior, then the differences between the example and the behavior are determined in step 179. Then in step 181, components of the behavior are replaced to reflect the new example, and the behavior is stored as code in step 177.

Figure 10:
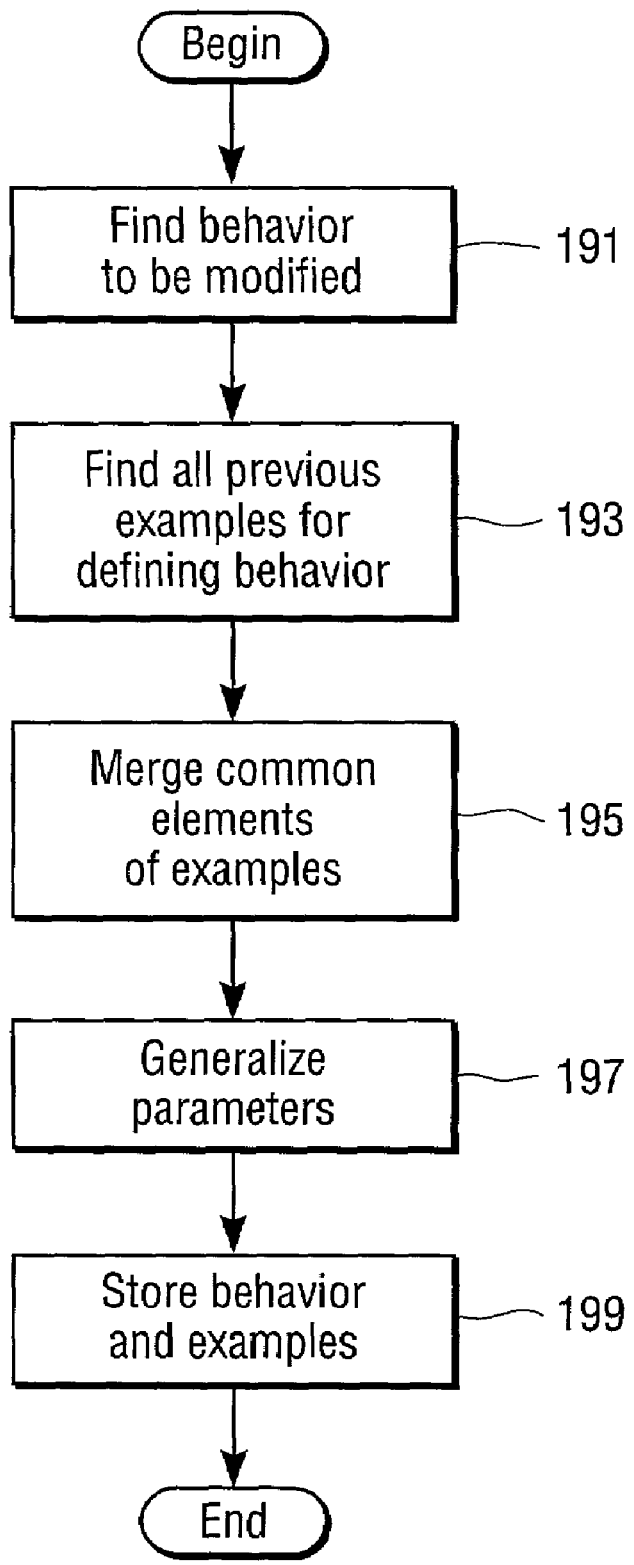
FIG. 10 illustrates a flowchart of an example inferencing algorithm for inferring behavior from multiple examples using an all-at-once approach.

In the all-at-once approach shown in FIG. 10, the system collects all the examples for a behavior together. The system then finds commonalties among the examples and merges them into a single behavior. In particular, as seen in FIG. 10, the system in step 191 finds a behavior to be modified. All previous examples for defining behavior are found in step 193, and common elements of the examples are merged in step 195. The parameters are then generalized in step 197, and then the behavior and examples are stored in step 199.

The choice of inferencing algorithm strongly affects the usability of the system. As mentioned above, weaker inferencing algorithms require the developer to hand edit inferred code and strong algorithms do not. Also, some algorithms require the developer to specify the causes of a behavior separately from the results of a behavior and therefore require extra modes. Still other algorithms require all examples for a behavior to be specified at once and do not permit further examples to be added afterwards. All these factors and others cause there to be a tight coupling between the interaction and inferencing techniques in a programming by demonstration system. Any desired interaction techniques influences the sorts of inferencing the system must provide, and the inferencing algorithm determines the sorts of information the interaction techniques must provide.

The present invention is not restricted to any particular inferencing engine or algorithm. However, as discussed, the choice of inferencing algorithm strongly affects the usability of the system, and therefore the preferred embodiment of the present invention uses an inferencing algorithm that infers behaviors from multiple examples in an incremental fashion. This results in a flexible and general-purpose, yet easy-to-use programming system.

The above description of specific embodiments should not necessarily be construed to limit the scope of the present invention. The scope of the present invention is limited only by the issued claims.

What is claimed:

1. A computer programming method for use in controlling an automation process, said method comprising the steps of:
    providing on a first computer platform a programming by demonstration tool for combining programming of a control program and of its user interface and thereby producing the control program and its user interface at the same time, said programming by demonstration tool including a library of widgets, an editor operative to allow editing including manipulating any of said widgets and an inferencing engine for recording and processing said manipulation to produce executable code;
    providing an input/output module, interfacing with said programming by demonstration tool, for coupling said widgets to input and output signals of an automation process, wherein said executable code is used to control said automation process; and
    providing a code compiler, said code compiler compiling said executable code to run on a second computer platform different from said first computer platform, wherein said first computer platform comprises a desktop operating system platform and said second computer platform comprises a PLC (programmable logic controller).

2. The method of claim 1, wherein said widgets include user interface widgets that are used for providing feedback for a runtime monitoring and control of said automation process.

3. The method of claim 2, wherein said feedback is a visual change, animation, sound, other form of stimulus, triggering of an event, or a combination thereof.

4. The method of claim 2, wherein the user interface widgets are further used for acquiring input data to allow user input for the runtime monitoring and control of said automation process.

5. The method of claim 1, wherein said program widgets include machine widgets, programming widgets, and user interface widgets.

6. The method of claim 1 wherein said automation process comprises a home automation process, building automation process, an industrial automation process, or other automation-based process.

7. A method as in claim 1, wherein the library of widgets is commonly used for programming both the control program and its user interface.

8. A computer programming product for use in controlling an automation process, said product comprising:
    a computer-readable medium embodying program code of a programming by demonstration tool for combining programming of a control program and of its user interface and thereby producing the control program and its user interface at the same time, wherein the program by demonstration tool includes a library of widgets, an editor operative to allow editing including manipulating any of said widgets, an inferencing engine for recording and processing said manipulation to produce executable code, and an input/output module for coupling said widgets to input and output signals of an automation process, wherein said executable code is used to control said automation process, wherein said program code is instantiated on a first computer platform, and wherein said programming by demonstration tool further comprises:
    a code compiler, said code compiler compiling said executable code to run on a second computer platform different from said first computer platform, wherein said first computer platform comprises a desktop operating system platform and said second computer platform comprises a PLC (programmable logic controller).

9. The product of claim 8, wherein said widgets include user interface widgets that are used for providing feedback for a runtime monitoring and control of said automation process.

10. The product of claim 9, wherein said feedback is a visual change, animation, sound, other form of stimulus, triggering of an event, or a combination thereof.

11. The product of claim 8, wherein the user interface widgets are further used for acquiring input data to allow user input for the runtime monitoring and control of said automation process.

12. The product of claim 8, wherein said program widgets include machine widgets, programming widgets, and user interface widgets.

13. The product of claim 8, wherein said automation process comprises a home automation process, building automation process, an industrial automation process, or other automation-based process.

14. A product as in claim 8, wherein the library of widgets is commonly used for programming both the control program and its user interface.

* * * * *